(12) United States Patent
Martin et al.

(10) Patent No.: US 9,363,976 B2
(45) Date of Patent: Jun. 14, 2016

(54) APPARATUS AND METHOD FOR PET WASTE CONTAINMENT AND DISPOSAL

(71) Applicants: John Martin, Winston-Salem, NC (US); Peter Palmer, Pleasanton, CA (US)

(72) Inventors: John Martin, Winston-Salem, NC (US); Peter Palmer, Pleasanton, CA (US)

(*) Notice: Subject to any disclaimer, the term of this patent is extended or adjusted under 35 U.S.C. 154(b) by 157 days.

(21) Appl. No.: 14/104,262

(22) Filed: Dec. 12, 2013

(65) Prior Publication Data

US 2014/0158060 A1 Jun. 12, 2014

Related U.S. Application Data

(60) Provisional application No. 61/736,120, filed on Dec. 12, 2012.

(51) Int. Cl.
*A01K 29/00* (2006.01)
*A01K 1/01* (2006.01)

(52) U.S. Cl.
CPC .................................. *A01K 1/0107* (2013.01)

(58) Field of Classification Search
CPC ................................................. A01K 1/0107
USPC .......... 119/165, 166, 167, 168, 169, 170, 171
See application file for complete search history.

(56) References Cited

U.S. PATENT DOCUMENTS

| 2,505,176 | A | * | 4/1950 | Elder | 112/411 |
| 3,752,121 | A | * | 8/1973 | Brazzell | 119/169 |
| 7,392,765 | B2 | * | 7/2008 | Lingmann | 119/526 |
| 7,654,227 | B1 | * | 2/2010 | Yananton | 119/169 |
| 2006/0236949 | A1 | * | 10/2006 | Hill et al. | 119/166 |
| 2012/0118241 | A1 | * | 5/2012 | Smith et al. | 119/167 |

FOREIGN PATENT DOCUMENTS

WO   WO 9526629 A1 * 10/1995

* cited by examiner

*Primary Examiner* — Kristen C Hayes
*Assistant Examiner* — Ebony Evans

(57) ABSTRACT

Herein described is a portable sanitation apparatus for pet waste disposal and method for using the same comprising an overall composite structure with a plurality of primary layers with one or more sublayers and an engagement means for attaching the two primary layers together.

20 Claims, 10 Drawing Sheets

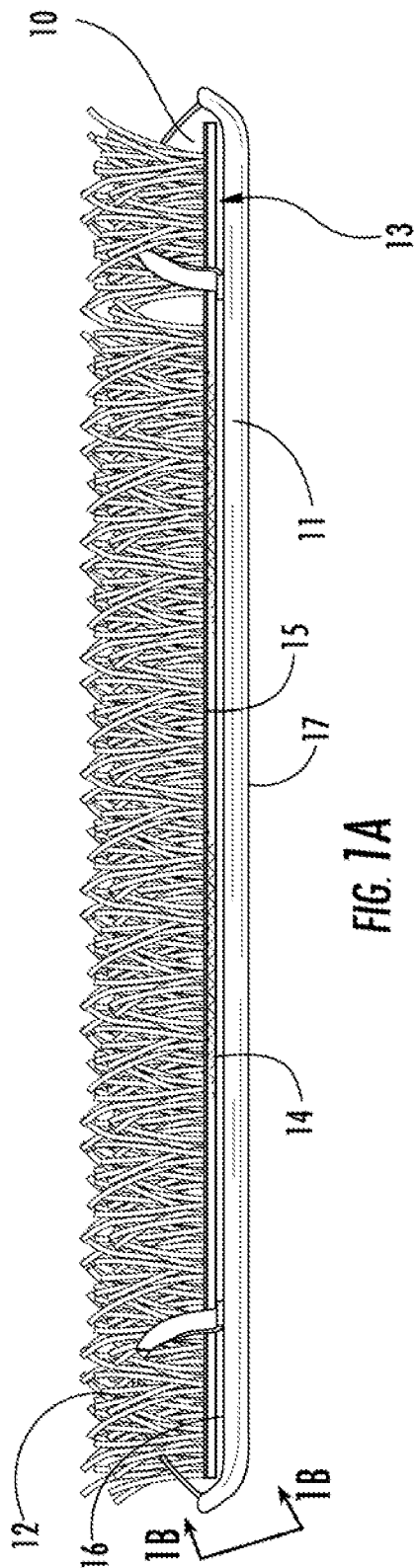
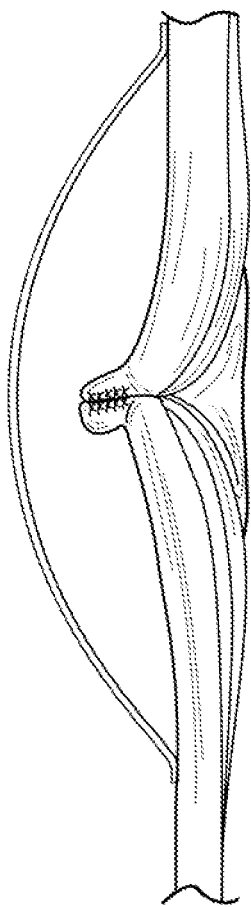
FIG. 1A
FIG. 1B

APPARATUS AND METHOD FOR PET WASTE CONTAINMENT AND DISPOSAL

CROSS REFERENCE TO RELATED APPLICATIONS

This application claims priority to U.S. Provisional Patent Application Ser. No. 61/736,120 filed Dec. 12, 2012. The disclosure of U.S. Provisional Patent Application 61/736,120 is incorporated by reference herein in its entirely.

FIELD

The general field is pet waste containment and disposal systems, in particular, a portable sanitation apparatus for pet waste disposal comprising an overall composite structure with two primary layers and an engagement means for attaching the two primary layers together.

BACKGROUND

Urban pet owners, particularly those who live in small flats, condominiums and/or apartments have very few waste disposal options when it comes to pets. While the owners are away for any significant amount of time, the dog or cat will undoubtedly need to urinate and/or defecate and, unless the person is willing to hire a dog walker, pet owners must endure some unpleasant conditions when they return to the dwelling. Moreover, allowing a pet to urinate unconditionally within an inhabited area is clearly contrary to good health practices. Thus, it is highly desirable to confine the urination to a small area where the urine can be collected and disposed of hygienically.

Feline pets, such as house cats, are capable of being trained to use litter boxes—a very convenient, sanitary, and effective means to contain and dispose of feline waste. Litter boxes or litter trays are filled with a granular substance (generally known as cat litter) which absorbs urine and covers feces reducing or camouflaging the odor. While cats are fairly easy to train to use litter boxes, other pets (notably dogs) are difficult or impossible to train in such a manner. Thus, an alternative solution is necessary.

Canine pets are very territorial and they tend to mark their territory with their urine. It is quite common for outside dogs to urinate in the same place or places repeatedly due to the scent left by a dog's urine. Moreover, it has been found that dogs may be enticed to urinate in a particular area of a dwelling if the artificial environment resembles a natural environment, such as grass. Artificial turf has been used successfully in this manner. Additional incentive may be achieved by impregnating the artificial turf with substances which signal marking.

Artificial turf alone is very porous and offers little resistance to the passing of urine; therefore some means of containing the urine is necessary. Placing the turf in a tray filled with "cat litter" is not a practical solution to containment since the relatively high sides of the tray detract from the aim of providing an area which looks natural to the pet. To overcome this problem, the cat litter is often replaced with a relatively thin sheet of absorbent material which, when saturated, can be either disposed of and replaced or washed and re-used. Thus, there are products currently on the market that employ a rigid bottom or tray, followed by a layer of absorbent material, and followed by a layer of artificial turf on top. The tray serves two purposes: it contains any urine that might seep through or drip down the sides of the absorbent material and it secures the absorbent material in position directly underneath the porous artificial turf so that maximum urine capture is achieved.

A problem with these products is that they are difficult and cumbersome to transport from one location to the next and difficult to clean. While the top two layers may be rolled up and conveniently stored away, the bottom rigid layer or tray cannot. But without the tray to maintain proper positioning of the absorbent layer underneath the porous artificial turf layer, the product would be useless and the pet owner would be forced to discard urine from and clean the tray too often.

One advantage to the present system is that it enhances the toilet design by achieving and maintaining proper positioning of the absorbent layer with the top porous artificial layer without the bottom rigid tray. Another advantage to the present system is that the user can conveniently clean the composite with conventional washing machines, whereas prior devices were unable to be cleaned in this fashion.

BRIEF DESCRIPTION OF THE DRAWINGS

Representative embodiments of the invention are disclosed in more detail with reference to the following figures. Like reference numerals designate corresponding parts or steps throughout the different views.

FIG. 1A shows side view of an embodiment of the present invention and FIG. B shows an illustration of a cradle stitching embodiment at the corner of the second layer.

SUMMARY

Figure 2:
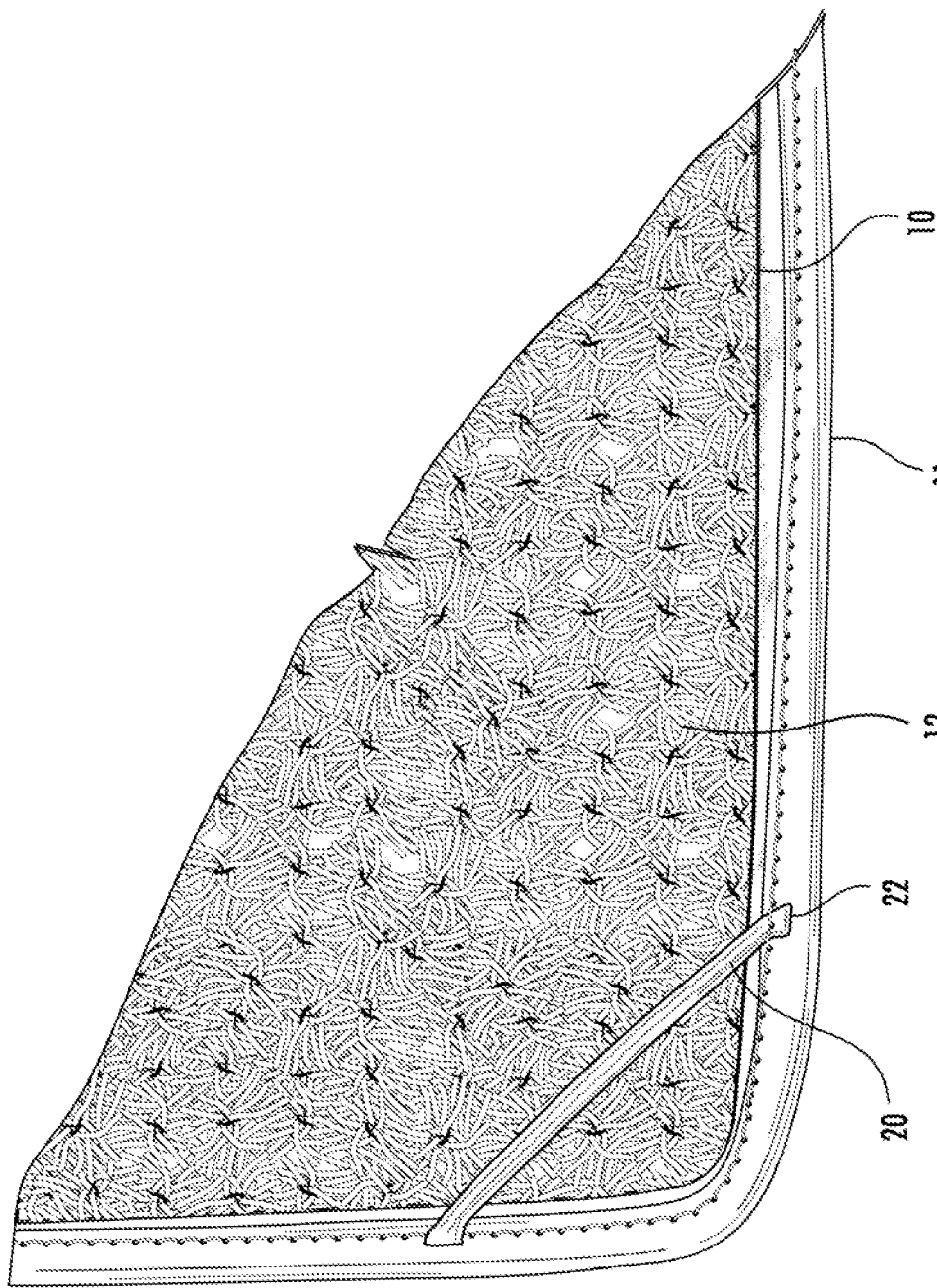
FIG. 2 shows an elevation view of an embodiment of the present invention.

A portable sanitation apparatus for pet waste disposal is provided generally comprising a composite structure with a plurality of layers. In one embodiment, the structure comprises at least two primary layers. In some embodiments, at least one of the primary layers comprises an engagement means wherein the two primary layers are held together in a relatively stable position with respect to another, but wherein the two primary layers may easily and conveniently be disengaged and disassembled.

In one embodiment, the portable sanitation apparatus comprises two primary layers, a first layer and a second layer. The first layer of the composite structure may have a composition resembling that of a natural outside environment, such as grass for example and may, itself, comprise multiple layers. In some embodiments, the first layer may comprise artificial grass-like fibers made from compounds selected from the group consisting of polypropylene, polyethylene, polymethylpentene, polybutene-1, polyisobutylene, ethylene propylene rubber, and ethylene propylene diene Monomer rubber. The first layer may also comprise a backing material wherein further comprising a mesh substrate, a meshed backing material, and a binder material.

The second layer of the composite structure also may comprise multiple layers. In some embodiments, the second layer comprises at least a top absorbent layer designed to trap and hold urine or other fluid therein and an impervious backing layer that prevents passage of urine or other fluids. The second layer may also comprise an impervious backing element for preventing moisture from escaping the absorbant top element.

In one embodiment, the absorbant top element comprises a blend of thermoplastic and cellulosic fibers mechanically entangled and heat bonded together. In one embodiment, the impervious backing element may comprise a woven polyester knit fabric reinforced with polyvinyl chloride.

In one embodiment, the binder material in the first layer may be deposited to the surface of the mesh substrate and made of a compound selected from the group consisting of latex, acrylic styrenated acrylics, vinyl acetate, ethylene vinyl acetate, styrene butadiene, polyvinyl chloride, ethyl/vinyl chloride. In another embodiment, the binder material may be made of styrene butadiene latex.

In some embodiments, the top absorbant element may comprise 40% by weight of rayon, 17% by weight of polyester, 21% by weight of polyethylene and a low melt polyester blend, and 22% by weight of polypropylene. In another embodiment, the top absorbant element may comprise at least about 40% by weight of rayon. In an alternative embodiment, the top absorbant element comprises at least about 40% by weight of cotton. And in yet another embodiment, the top absorbant element comprises at least about 40% by weight of a cotton and rayon blend.

In some embodiments, the top absorbant element may comprise an antimicrobial agent. In one embodiment, the top absorbant element comprises 2,4,4'-trichloro-2'-hydroxydiphenyl ether as the antimicrobial agent.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in some embodiments" or "in a preferred embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

By way of illustration, FIG. 1 shows a side view of an embodiment of the invention. The overall composite structure comprises a plurality of layers designed to prevent pet liquid waste from leaving the composite structure and leaking onto the surface upon which the composite structure rests. In one embodiment, the composite structure comprises a first layer 10 fabricated as to mimic a naturally occurring surface (such as artificial turf) familiar to the pet. The structure also may comprise a second layer 11 comprised of an absorbent material. It should be recognized that some users of the pet waste disposal system of the present invention may desire to forego one or more of the layers. For example, users may determine that their pet does not require the first layer 10 which is designed to mimic a naturally occurring surface and does little to absorb and confine the pet waste. In this vein, the user may simply use the second layer 11 or the second layer combined with another layer.

As mentioned above, in some embodiments, first layer 10 may simulate the look and feel of natural turf. Preparations of natural or artificial turf are known in the art and described in U.S. Pat. Nos. 1,939,846; 3,332,828; 3,944,452; 3,995,079; 4,007,307; 4,012,545; 4,230,752; and 4,268,551. Similarly, a variety of artificial turf mat constructions have been designed for golf practice surfaces. For example, U.S. Pat. No. 6,156,396 uses a relatively thick base pad of resilient material (foam rubber) and an artificial grass-like carpet. U.S. Pat. No. 5,830,080 by Reynolds discloses a turf simulating surface including a grass-like carpet layer placed over various layers of material, each layer designed to simulate the shock absorbing nature of corresponding layers of soil. Each of the preceding U.S. patents is incorporated by reference in its entirety and in a manner consistent with the present document. It should be understood that the present invention is likewise applicable to structures, composites, or products.

As depicted in the embodiments shown in FIGS. 1A, 2, 3, and 6, first layer 10 is an artificial grass-like structure comprising grass-like fibers 12 from the olefin family of polymers. For example, the fibers may be composed of polypropylene, polyethylene, polymethylpentene, polybutene-1, polyisobutylene, ethylene propylene rubber, ethylene propylene diene Monomer rubber, at the like. In a preferred embodiment, grass-like fibers 12 are made of polyethylene.

Figure 3:
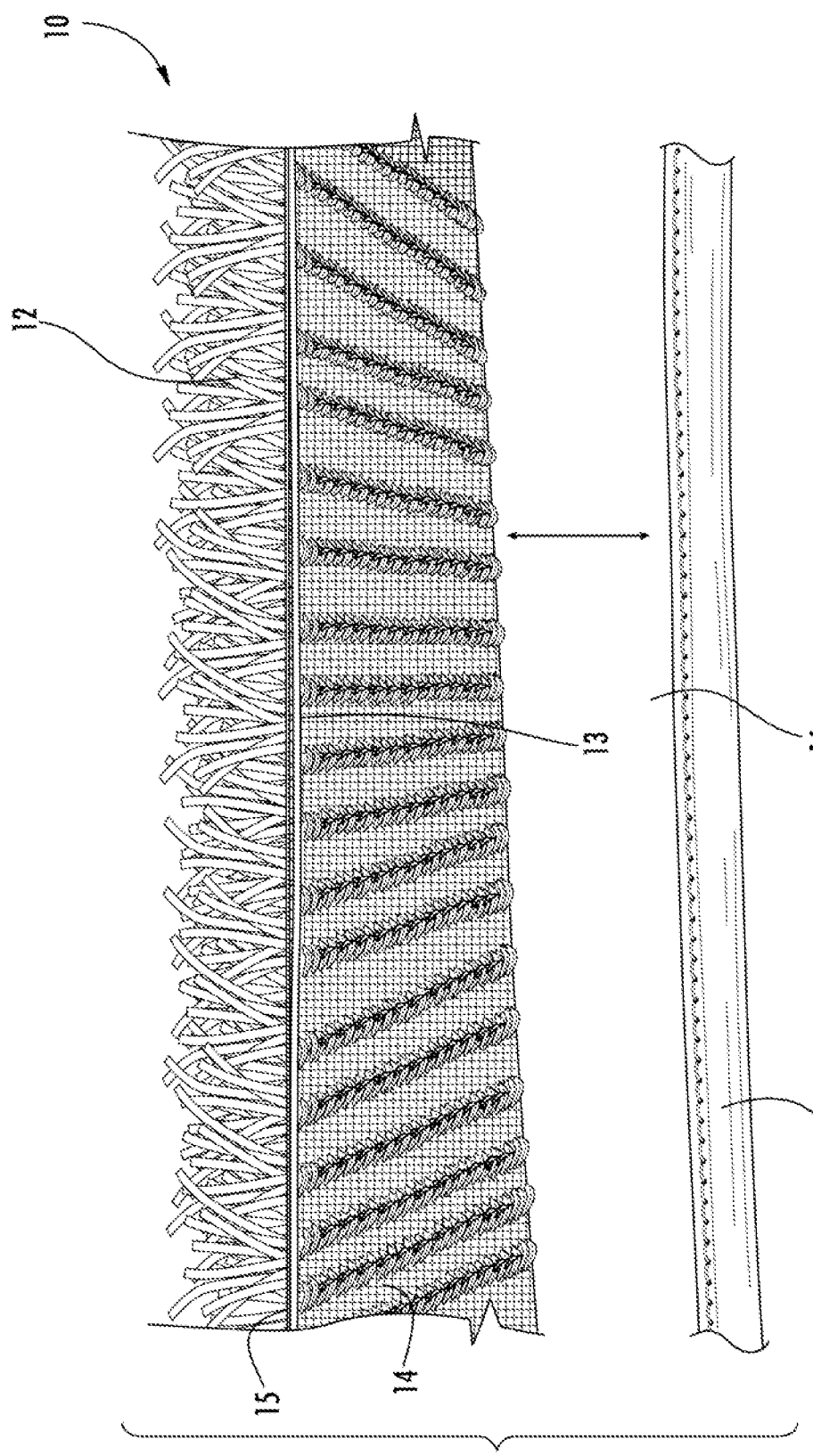
FIG. 3 shows a side view of an embodiment of the present invention with first layer lifted and exposing second layer.

Referring primarily to the embodiment shown in FIG. 3, first layer 10 includes a backing 13 which comprises a mesh substrate 14 made of a material flexible enough to allow some folding or rolling of the carpet, but rigid enough to maintain the general shape and form. In one embodiment, mesh substrate 14 is made of a polyolefin based polymer, for example polypropylene, polyethylene, polymethylpentene, polybutene-1, polyisobutylene, ethylene propylene rubber, ethylene propylene diene monomer rubber, at the like. In a preferred embodiment, mesh substrate 14 is made of polypropylene.

Figure 6:
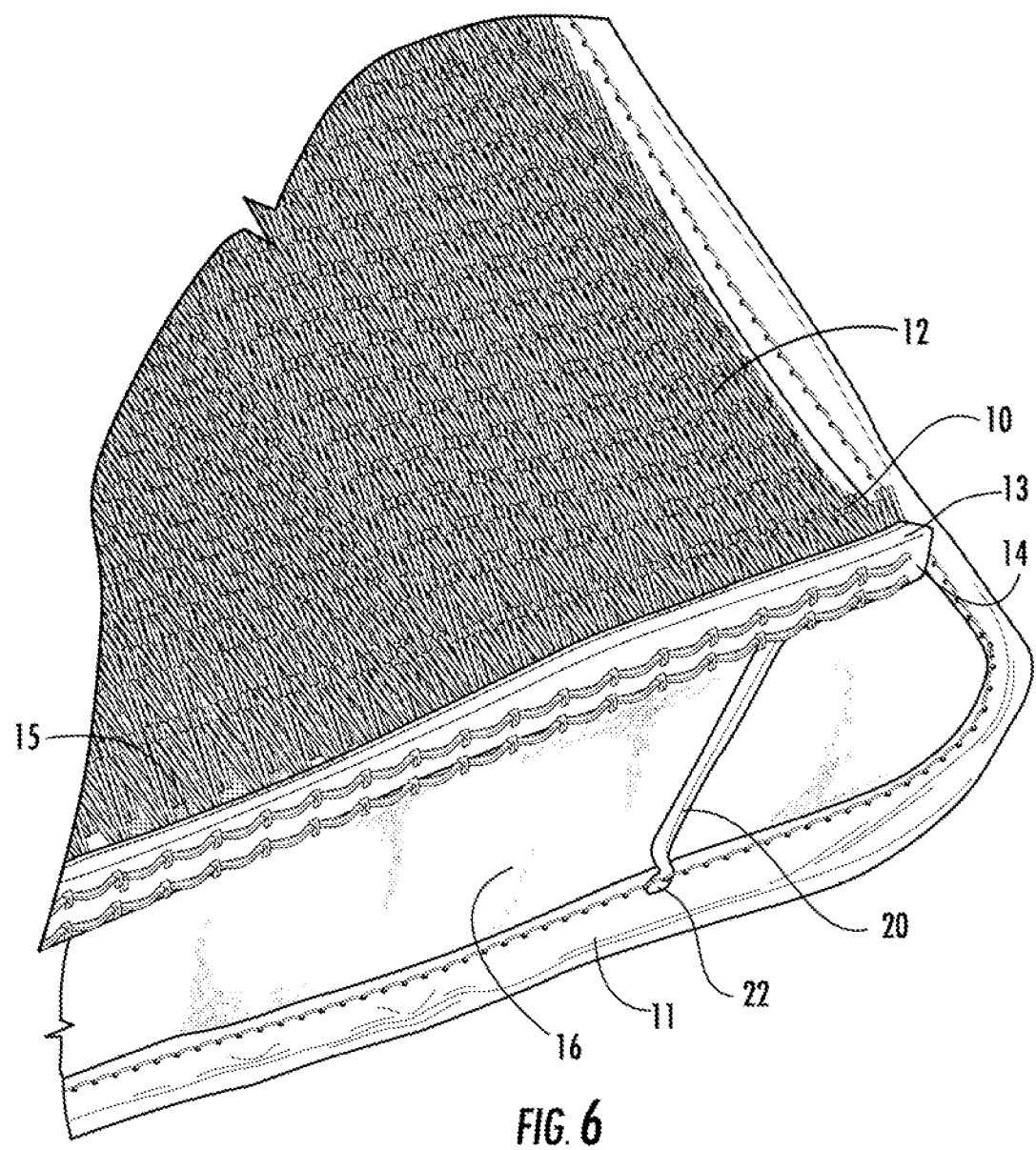
FIG. 6 shows an elevation view of an embodiment of the present invention.

Referring now the embodiment illustrated in FIG. 6, backing 13 on first layer 10 further comprises a thin meshed backing material 15 that is affixed to the mesh substrate 14 in between the grass-like fibers 12 and the mesh substrate 14. Meshed backing material 15 may be affixed to mesh substrate 14 by any means known to those of skill in the art, including gluing and the like. In some embodiments, grass-like fibers 12 are woven or punched through meshed backing material 15 into and through mesh substrate 14.

Backing 13 on first layer 10 may additionally comprise a binder material for affixing or binding the grass-like fibers 12 to the mesh substrate 14 and meshed backing material 15. In a preferred embodiment, said binder material is deposited to the surface of the mesh substrate 14 at or near where the grass-like fibers 12 emerge there through. Suitable binding materials include latex, acrylic, styrenated acrylics, vinyl acetate (VAC), ethylene vinyl acetate (EVA), styrene-butadiene, polyvinyl chloride (PVC), ethylene/vinyl chloride and the like. In a preferred embodiment, the binder material is styrene butadiene latex.

Absorbent second layer 11, itself, may comprise multiple layers. Examples of such absorbent composite multi-layered structures are known in the art and have been described in, for example, U.S. Pat. No. 4,798,603 issued Jan. 17, 1989 to Meyer et al. and entitled Absorbent Article Having a Hydrophobic Transport Layer. Other examples include, U.S. Pat. No. 4,338,371 issued Jul. 6, 1982 to F. Dawn, et al. and U.S. Pat. No. 4,259,958 issued Apr. 7, 1981 to R. Goodbar. Other configurations have employed embossed layers configured to provide raised regions that separate the user from the absorbent pad. For example, see U.S. Pat. No. 4,324,247 issued Apr. 13, 1986 to M, Aziz; U.S. Pat. No. 4,041,951 issued Aug. 16, 1977 to L. Sanford; U.S. Pat. No. 3,945,386 issued Mar. 23, 1976 to E. Anczurowski, et al.; and U.S. Pat. No. 4,413,032 issued Nov. 1, 1983 to L. Hartmann, et al., U.S. Pat. No. 4,480,000 issued Oct. 30, 1984 to I. Watanabe, et al. describes an absorbent article which includes an absorbent core layer and a barrier covering, the lateral faces and the underneath face of the absorbent core layer. A web predominantly comprised of a polyester fiber is placed on top of the absorbent core layer, and a nonwoven fabric is wrapped around the structure. The absorbent articles are described as being able to absorb fluid at an enhanced rate and have a feeling of dryness even after such absorption. U.S. Pat. No. 3,987,792 issued Oct. 26, 1976 to J. Hernandez, et al. describes a disposable diaper comprising, in order, a water-pervious layer; a spongy, resilient and compressible hydrophobic fibrous layer; an absorbent core; and a water-impervious layer. The hydrophobic fibrous layer is pervious to fluids in the uncompressed condition, but is impervious to fluids when compressed. The description indicates that the compressed fibers intermesh to form a seal or barrier. Each of the preceding U.S. patents is incorporated by reference in its entirety and in a manner consistent with the present document.

Figure 7:
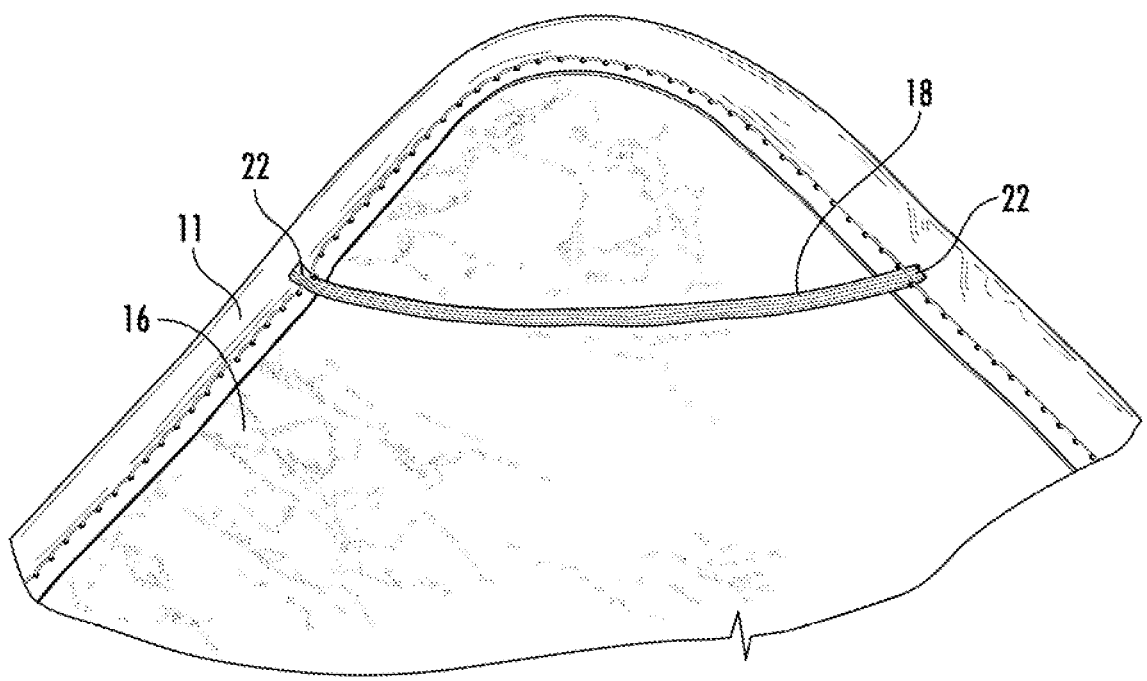
FIG. 7 shows an elevation view of an embodiment of the second layer.

Referring now to FIGS. 6 and 7, absorbent second layer 11 comprises at least two layers, a top layer 16 and a bottom layer 17 (not shown). Bottom layer 17 may be described as an impervious "fabric-like" synthetic composition designed to prevent moisture from escaping from the composite after it passes into the absorbent top layer 16. In one embodiment, bottom layer 17 comprises a woven polyester knit fabric reinforced with polyvinyl chloride (PVC). In a preferred embodiment, the reinforced polyvinyl chloride is on the side of the absorbent second layer 11 that is visible to the user of the apparatus to help confine liquid pet waste to the other layers.

Top layer 16 may consist of a synthetic and/or cellulosic blend of fibers that provides a durable structure. In one embodiment, top layer 16 is a blend of thermoplastic and cellulosic fibers that are mechanically entangled and heat bonded. Fibers suitable for the purposes of the invention include cellulosic and/or synthetic thermoplastic fibers, including but not limited to polyolefin polymers. For example, a suitable blend of natural and synthetic fibers for the purposes of the present invention consists of polyester (low melt), polyethylene, rayon, cotton, and/or polypropylene. In one embodiment, the rayon may be used in place of the cotton and vice versa.

Proportions of the blend of fibers comprising the top layer 16 for the purposes of the present invention are variable. Desirable performance has been noted when each individual fiber constituent is within about 10 to 75% by weight. For example, in one embodiment the proportions are as follows: rayon 40%, polyester 17%, polyethylene+low melt polyester 21%, and polypropylene 22% by weight. It has been observed that optimal absorbency is achieved when the blend is comprised of at least about 40% by weight of rayon and/or cotton.

Fiber constituents of the top layer 16 may contain certain agents embedded into the fibrous structure that improve the performance of the invention. For example, high density polyethylene fibers may be used which embed biocides, antimicrobials, anti-viral, and/or antifungal agents. Examples of commercially available antimicrobial agents that are suitable for the present disclosure include BARDAC®. 2050 and BARDAC® 2080 (based on dialkyl($C_8$-$C_{10}$)dimethyl ammonium chloride); BARDAC®. 2250 and BARDAC®. 2280 (didecyl dimethyl ammonium chloride); BARDAC®. LF and BARDAC®. LF 80 (based on dioctyl dimethyl ammonium chloride); BARQUAT® MB-50 and BARQUAT® MB-80 (based on alkyl dimethyl benzyl ammonium chloride); BARQUAT® MX-50 and BARQUAT® MX-80 (based on alkyl dimethyl benzyl ammonium chloride); BARQUAT® OJ-50 and BARQUAT® OJ-80 (based on alkyl dimethyl benzyl ammonium chloride); BARQUAT® 4250, BARQUAT® 4280, BARQUAT® 4250Z, and BARQUAT® 4280Z (based on alkyl dimethyl benzyl ammonium chloride and/or alkyl dimethyl ethyl benzyl ammonium chloride); and BARQUAT® MS-100 (based on myristyl dimethyl benzyl ammonium chloride), which are available from Lonza, Inc., Fairlawn, N.J.

Other anti-microbial agents that may be used in the present disclosure include halogenated diphenyl ethers like 2,4,4'-trichloro-2'-hydroxy-diphenyl ether (Triclosan® or TCS) or 2,2'-dihydroxy-5,5'-dibromo-diphenyl ether; phenolic compounds like phenoxyethanol, phenoxy propanol, phenoxyisopropanol, para-chloro-meta-xylenol (PCMX), etc.; bisphenolic compounds like 2,2'-methylene bis(4-chlorophenol), 2,2'-methylene bis(3,4,6-trichlorophenol), 2,2'-methylene bis(4-chloro-6-bromophenol), bis(2-hydroxy-3,5-dichlorophenyl)sulphide, and bis(2-hydroxy-5-chlorobenzyl)sulphide; halogenated carbanilides (e.g., 3,4,4'-trichlorocarbanilides (Triclocarbane or TCC); benzyl alcohols; chlorhexidine; chlorhexidine gluconate; and chlorhexidine hydrochloride. Other suitable antimicrobial compounds may include those supplied by Thomson Research Associates, Inc., such as Ultra-Fresh DM-50 or Silpure.

In some embodiments, absorbent second layer 11 may comprise additional layers at any position within the sandwich structure. For example, the absorbent second layer 11 may include a top cover component that is made of a material with substantial wicking properties that wicks the moisture through quickly and into the top layer 16. In some embodiments, the top cover component may be a porous synthetic woven material, for example, manufactured of polyester fibers or a polyester blend of fibers. Users who desire a higher friction coefficient of the absorbent second layer promoting a more stable engagement between first and second layer with minimal relative movement between the layers, may forego the top cover component and prefer an uncovered top layer 16. Top layer 16 may incorporate other constituents into its composition or may be treated in such a manner to promote greater friction between first layer 10 and the absorbent second layer 11.

Absorbent second layer 11 may be manufactured such that the corners and/or edges of the layer bend slightly upward as depicted in FIG. 1B. In this arrangement, second layer 11 is designed to cradle first layer 10 to confine the urine and/or other liquids to second layer 11's absorbent portions. This design would effectively prevent urine or other liquids from dripping down the sides of second layer 11. The cradling effect of second layer 11 may be accomplished using known assembly and stitching techniques which create sufficient tension and force at the corners to cause the corners to bend upwards as illustrated in FIG. 1B.

Figure 4:
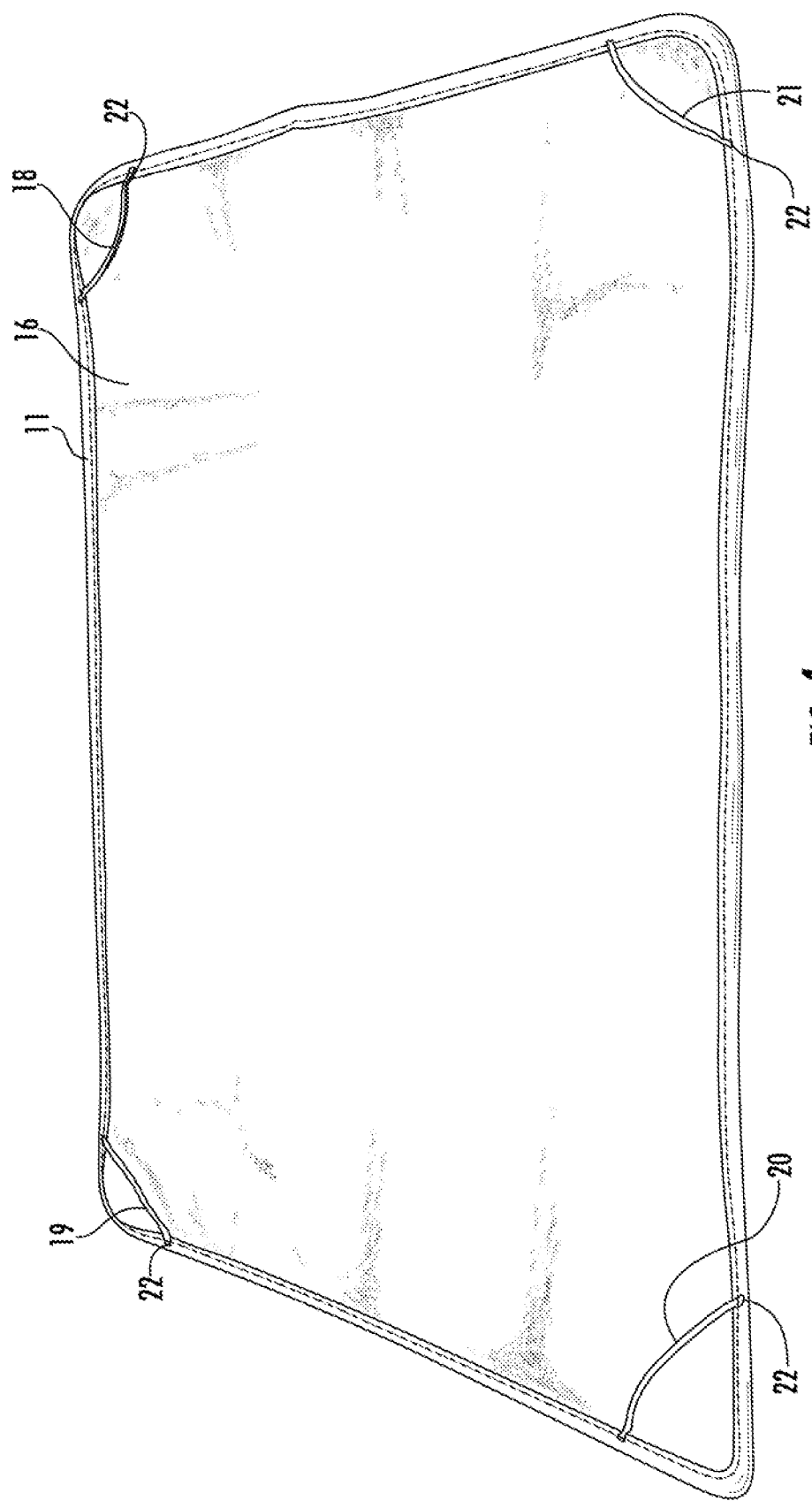
FIG. 4 shows an elevation view of an embodiment of the second layer of the present invention.
Figure 5:
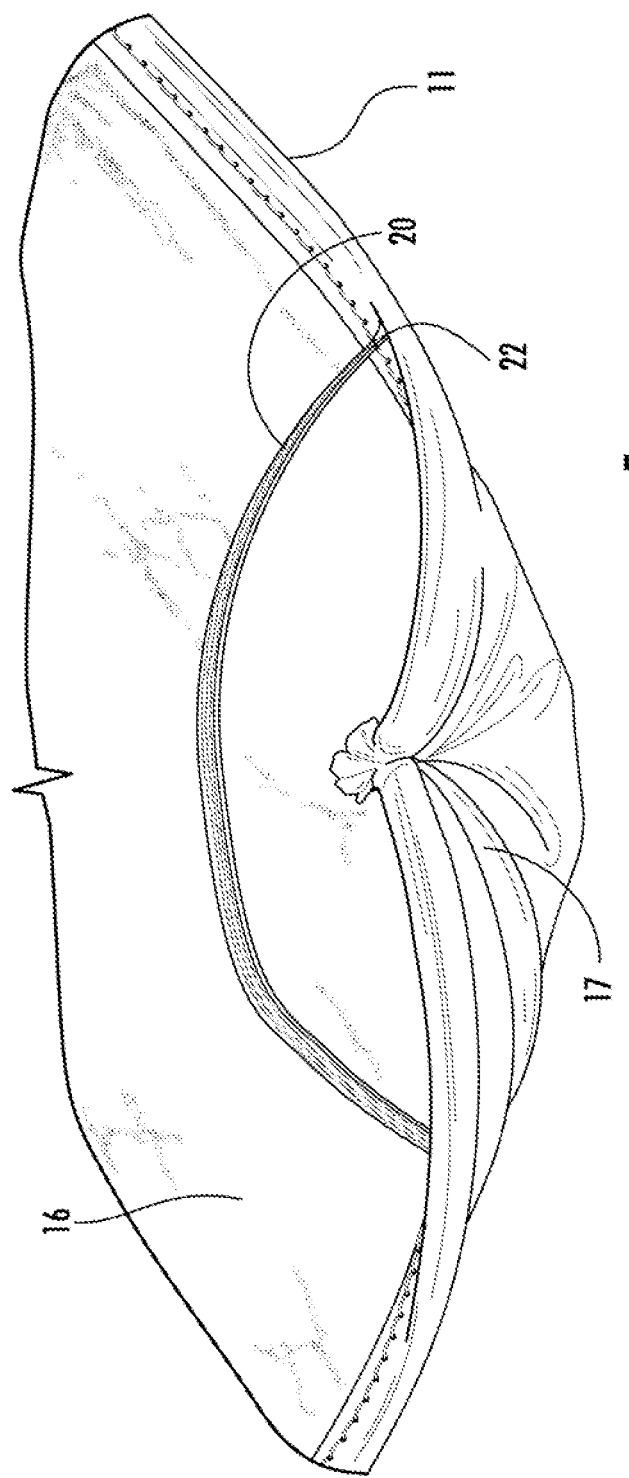
FIG. 5 shows an embodiment of the second layer with a cradle stitch design.

First layer 10 and/or second layer 11 may comprise an engagement means wherein first layer 10 may be secured to second layer 11 or vice versa. The engagement means employed must be capable of quick and convenient disengagement allowing the user to conveniently disassemble the overall composite structure and clean first layer 10 and second layer 11 as needed. Suitable structures for engagement between first layer 10 and second layer 11 include elastic straps, pressure sensitive adhesive, Velcro®, zippers, buttons, toggles, snaps, grommets, magnets, ties, and the like. In the embodiment illustrated in FIGS. 1, 2, and 4 engagement means comprises elastic straps 18, 19, 20, and 21 sewn at their termini into the binding 22 at each corner of the second layer 11. It should be recognized that the engagement means may be attached to any layer or component of the composite structure.

Figure 8:
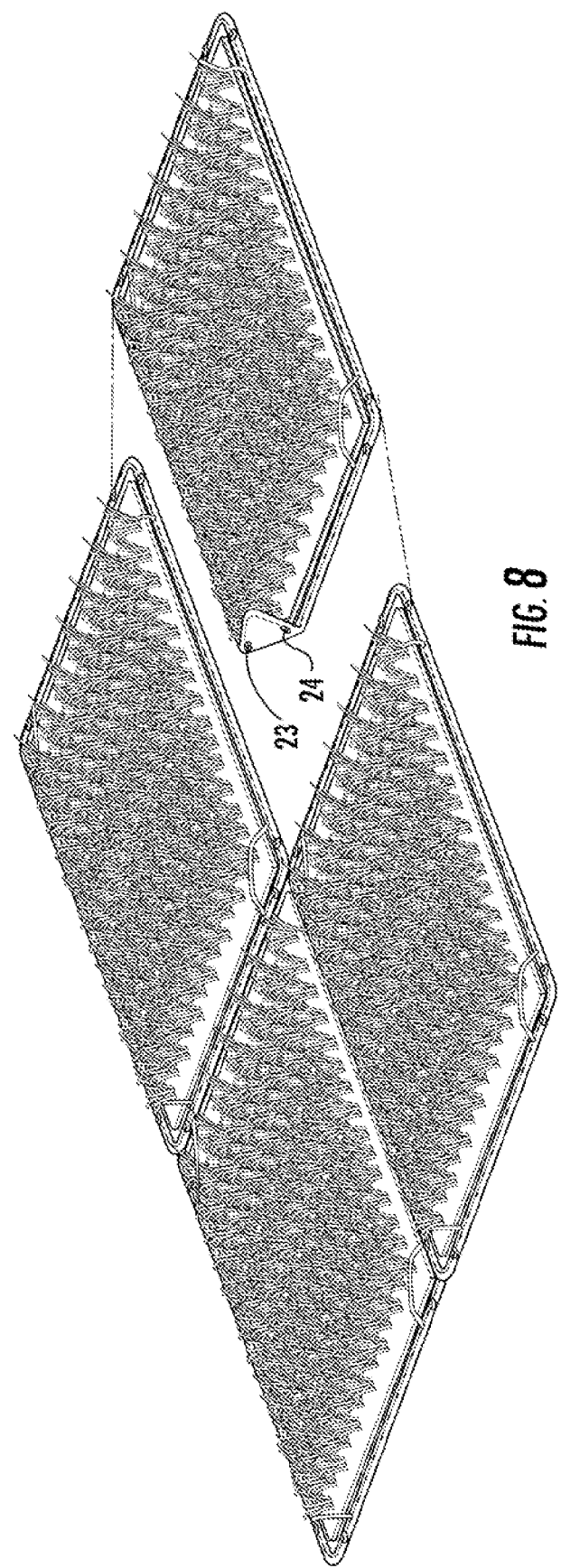
FIG. 8 shows an embodiment of the present invention illustrating modularity.

Referring now to FIG. 8, in some embodiments, one or more of the layers of the composite structure may be modular and attachable to other modular components to cover a larger area. For example, in one embodiment, second layer 11 comprises securing members, for example, 23 and 24, around the perimeter of the modular section which, in this embodiment, may be a 2'×3' rectangular section. Securing members may comprise snaps, buttons, Velcro, adhesive, or the like. It should be recognized that any method or structure may be used to secure adjacent modular sections to one another such that the sections are laid out substantially flat and with minimal overlap between them.

Figure 9:
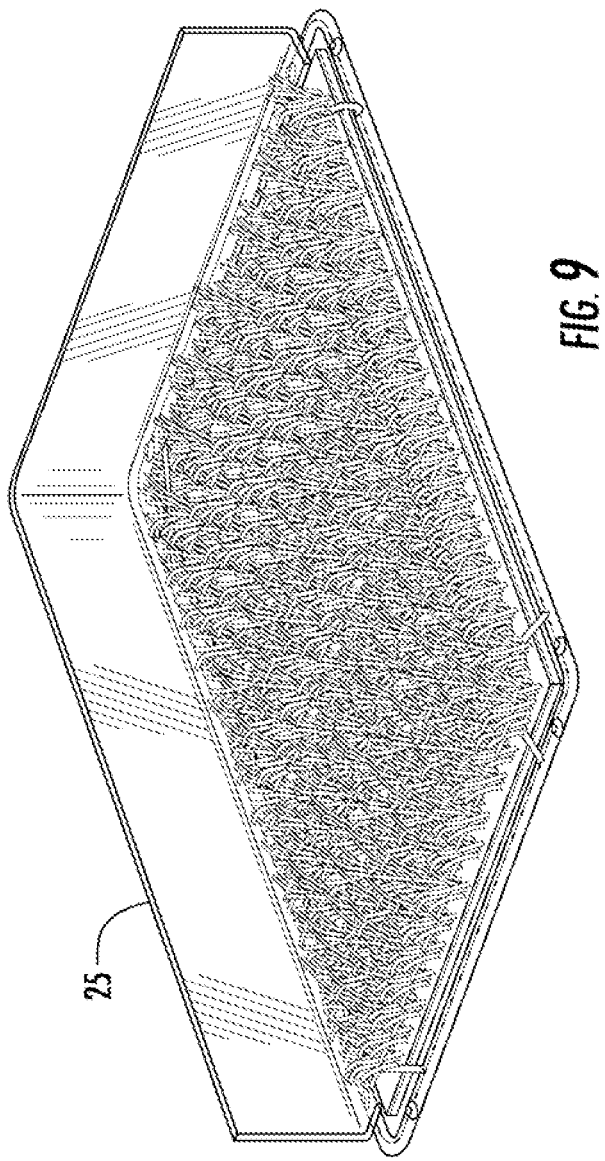
FIG. 9 shows an embodiment of the present invention with a vertical member attached.
Figure 10:
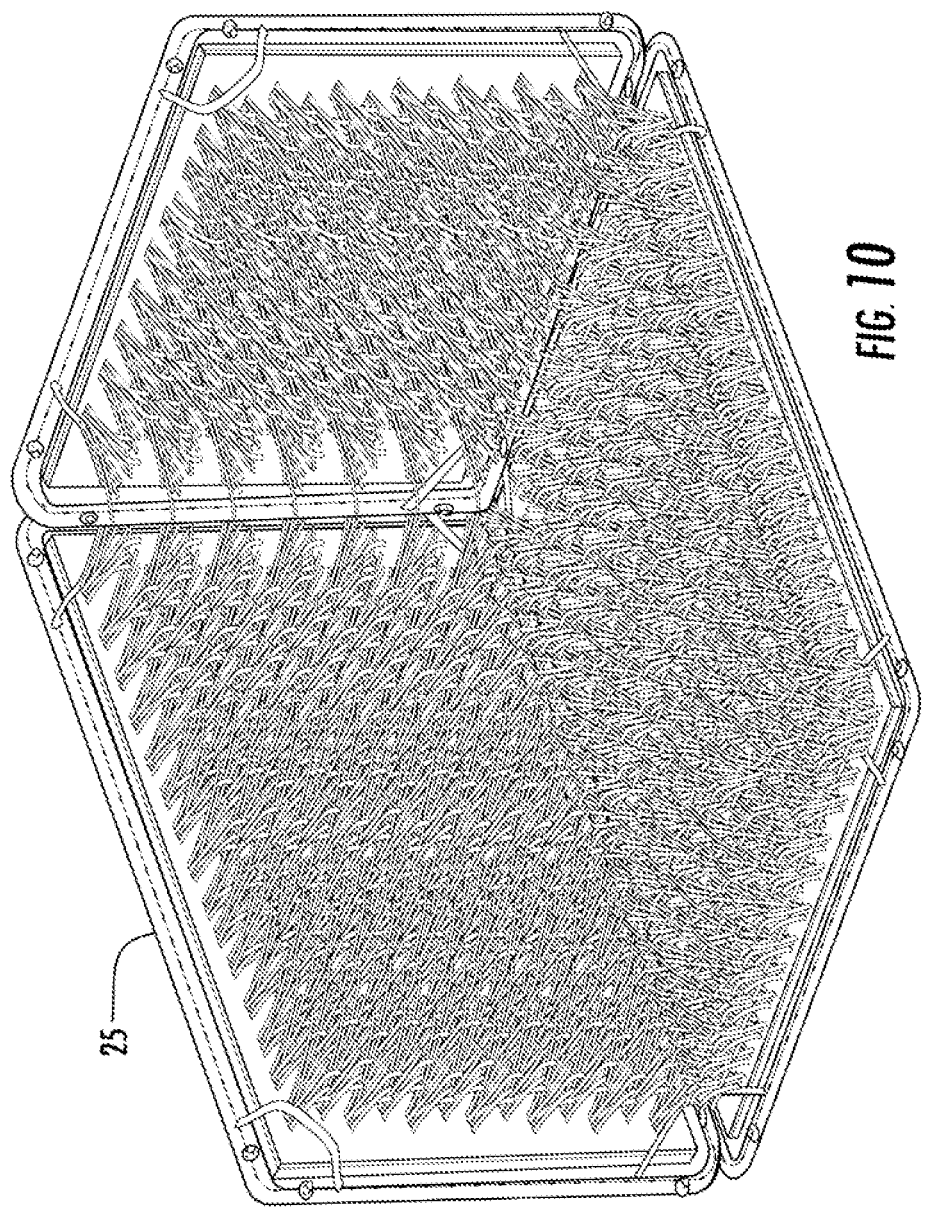
FIG. 10 shows an embodiment of the present invention with a vertical member attached.

Referring now to FIGS. 9 and 10, in some embodiments, the composite structure also comprises a substantially vertical member 25 which helps to confine unwanted pet waste to the composite structure for pets with poor aim, in particular male dogs with a preference for the lifted leg method over the squatting method. It has been observed that male dogs frequently miss the composite structure surface when they lift their legs to urinate.

In one embodiment, the substantially vertical member 25 may be engaged to the composite structure around the perimeter and detachable therefrom. In some embodiments, the substantially vertical structure is itself modular. For example, in one embodiment, the substantially vertical structure comprises corner elements that are curved to surround the outer edge of each corner of the composite structure. Additionally, such a modular system might also comprise side panel elements that, in some embodiments, engage and connect to the corner members at their vertical edges. In said embodiments, the side panel elements run laterally down the outer edges of the composite structure between corner members. The substantially vertical structure may entirely surround the composite structure or may only guard a portion of the composite structure, for example, one side and two corners. In some embodiments, the securing members may be used to attach the components of the substantially vertical structure to the composite structure.

The substantially vertical member may be made of various materials, for example, thermoplastic materials including Poly(methyl methacrylate (PMMA) or plexiglas, as well as various polyolefin polymers, such as polyethylene or polypropylene. It should be recognized that many suitable materials are available for use in this manner as long as they are sufficiently rigid to maintain its substantially vertical orientation.

The substantially vertical member may also incorporate a decorative design, for example, the vertical member may be manufactured such that it resembles a picket fence. In another embodiment, one or more of the walls of the substantially vertical member may comprise a splatter dampening member. For example, in one embodiment, the interior wall may comprise an absorbent fabric covering to help prevent urine from splattering outside of the composite structure area.

The present invention also generally relates to a method of pet waste disposal wherein a user employs the system to conveniently and cleanly capture and discard pet waste with minimal waste contamination of the residence living environment. In one embodiment, the method comprises the steps of providing a composite structure according to the description of the embodiments provided above, attaching said first layer to said second layer, placing said composite structure on a solid support surface in a manner accessible to the animal, and cleaning said second layer when substantially saturated with liquid waste. In another embodiment, the method may further comprise the step of attaching a plurality of composite structures together to accommodate a larger area. In another embodiment, the method may also comprise attaching a substantially vertical element to the outer perimeter of the composite structure to avoid floor waste contamination.

While the present invention has been described herein with respect to the exemplary embodiments, it will become apparent to one of ordinary skill in the art that many modifications, improvements and sub-combinations of the various embodiments, adaptations and variations can be made to the invention without departing from the spirit and scope thereof.

What is claimed is:

1. A portable sanitation apparatus for pet waste disposal comprising:
   a first layer comprising artificial grass-like fibers made from compounds selected from the group consisting of polypropylene, polyethylene, polymethylpentene, polybutene-1, polyisobutylene, ethylene propylene rubber, and ethylene propylene diene Monomer rubber, and a backing material wherein said backing material further comprises a mesh substrate, a meshed backing material, and a binder material; and
   a second layer comprising an absorbant top element for trapping liquid therein and an impervious backing element for preventing moisture from escaping, the absorbant top element, said absorbant top element comprising a blend of thermoplastic and cellulosic fibers that are mechanically entangled and heat bonded together and said impervious backing element comprising a woven polyester knit fabric reinforced with polyvinyl chloride.

2. The portable sanitation apparatus of claim 1 wherein said mesh substrate further comprises a surface upon which said binder material is deposited and wherein said binder material is selected from the group consisting of latex, acrylic, styrenated acrylics, vinyl acetate, ethylene vinyl acetate, styrene butadiene, polyvinyl chloride, ethyl/vinyl chloride.

3. The portable sanitation apparatus of claim 1 wherein said binder material is made of styrene butadiene latex.

4. The portable sanitation apparatus of claim 1 wherein said absorbant top element comprises 40% by weight of rayon, 17% by weight of polyester, 21% by weight of polyethylene and a low melt polyester blend, and 22% by weight of polypropylene.

5. The portable sanitation apparatus of claim 1 wherein said absorbant top element comprises at least about 40% by weight of rayon.

6. The portable sanitation apparatus of claim 1 wherein said absorbant top element comprises at least about 40% by weight of cotton.

7. The portable sanitation apparatus of claim 1 wherein said absorbant top element comprises at least about 40% by weight of as cotton and rayon blend.

8. The portable sanitation apparatus of claim 1 wherein said absorbant top element comprises an antimicrobial agent.

9. The portable sanitation apparatus of claim 8 wherein said antimicrobial agent is 2,4,4'-trichloro-2'-hydroxy-diphenyl ether.

10. The portable sanitation apparatus of claim 1 further comprising a means of attaching said first layer to said second layer preventing leakage from second layer.

11. A method of pet waste containment and disposal comprising the steps of providing a portable sanitation apparatus comprising a first layer wherein said first layer comprises artificial grass-like fibers, a backing member, and a mesh substrate, and a second layer wherein said second layer comprises an absorbant top element and an impervious backing element; attaching said first layer to said second layer by attaching means; placing said attached first and second layer on a solid support surface in a manner accessible to the animal, and cleaning said second layer when substantially saturated with liquid waste.

12. The method of claim 11 further comprising the step of attaching a plurality of composite structures together by attaching means to accommodate a larger area.

13. The method of claim 11 further comprising the step of attaching a substantially vertical element to the pet waste disposal apparatus to avoid floor waste contamination.

14. The method of claim 11 wherein said absorbant top element comprises an antimicrobial agent.

15. The method of claim 11 further comprising a means of attaching said first layer to said second layer preventing leakage from second layer.

16. A portable sanitation apparatus for pet waste disposal comprising a first layer, a second layer, and a substantially vertical element, said second layer further comprising a top, bottom, and side outer edges and a front and back face wherein said second layer comprises an absorbent top element for trapping liquid therein and an impervious backing element for preventing moisture from escaping the absorbent top element and wherein said substantially vertical element is attached to and extends upward from said side outer edges.

17. The portable sanitation apparatus of claim 16 wherein said substantially vertical element further comprises corner elements that are curved to conform to the outer edge of each corner of at least the first layer.

18. The portable sanitation apparatus of claim 16 wherein said substantially vertical element further comprises side panels running laterally down the outer edges of the apparatus.

19. The portable sanitation apparatus of claim 16 wherein said substantially vertical element further comprises a waste splatter dampening member.

20. The portable sanitation apparatus of claim 16 wherein said absorbant top element comprises an antimicrobial agent.

* * * * *